(12) United States Patent
Penza et al.

(10) Patent No.: US 10,378,992 B2
(45) Date of Patent: Aug. 13, 2019

(54) SYSTEM AND METHOD FOR PIPELINE INSPECTION

(71) Applicant: ULC ROBOTICS, INC., Hauppauge, NY (US)

(72) Inventors: G. Gregory Penza, Old Field, NY (US); Robert E. Kodadek, Long Beach, NY (US); Michael Passaretti, Smithtown, NY (US); Eric S. Feldman, Glen Head, NY (US); Benjamin Lagosz-Sinclair, Brooklyn, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 154 days.

(21) Appl. No.: 15/788,223

(22) Filed: Oct. 19, 2017

(65) Prior Publication Data

US 2018/0106697 A1 Apr. 19, 2018

Related U.S. Application Data

(60) Provisional application No. 62/409,924, filed on Oct. 19, 2016.

(51) Int. Cl.
*G01M 3/00* (2006.01)
*G01D 11/24* (2006.01)
*F16L 55/40* (2006.01)

(52) U.S. Cl.
CPC ............. *G01M 3/005* (2013.01); *F16L 55/40* (2013.01); *G01D 11/245* (2013.01)

(58) Field of Classification Search
CPC ....... G01M 3/005; F16L 55/40; G01D 11/245
See application file for complete search history.

(56) References Cited

U.S. PATENT DOCUMENTS

| | | | |
|---|---|---|---|
| 4,537,136 A | 8/1985 | Douglas | |
| 4,677,865 A | 7/1987 | Lehmann | |
| 6,031,371 A | 2/2000 | Smart | |
| 6,142,187 A | 11/2000 | Goldenberg et al. | |
| 7,812,328 B2 | 10/2010 | Betz | |

(Continued)

FOREIGN PATENT DOCUMENTS

| | | |
|---|---|---|
| CN | 104500914 A | 4/2015 |
| DE | 10215325 A1 | 10/2003 |

(Continued)

OTHER PUBLICATIONS

European Search Report for EP App. No. 17 19 7396 dated Feb. 7, 2018.

(Continued)

*Primary Examiner* — Jamel E Williams
(74) *Attorney, Agent, or Firm* — Brooks Kushman P.C.

(57) ABSTRACT

A system and method for pipeline inspection may include a transport module having a sensor arrangement configured to carry one or more sensors, and it may be movable longitudinally through the pipeline and circumferentially around an interior of the pipeline. The sensor arrangement may include a sensor and a sensor cover selectively disposable over the sensor for isolating the sensor from contact with the inside surface of a wall of the pipeline. The sensor cover may include a cleaning arrangement disposed proximate the sensor for removing debris from the sensor.

20 Claims, 8 Drawing Sheets

(56) References Cited

U.S. PATENT DOCUMENTS

| | | |
|---|---|---|
| 8,060,257 B2 | 11/2011 | Close et al. |
| 8,079,432 B2 | 12/2011 | Ohm et al. |
| 8,170,715 B1 | 5/2012 | Vallapuzha et al. |
| 8,925,590 B2 | 1/2015 | Khalifa et al. |
| 2006/0220640 A1 | 10/2006 | Thompson et al. |
| 2007/0022830 A1* | 2/2007 | Mandziuk ............... F16L 55/40 73/865.8 |
| 2007/0174983 A1 | 8/2007 | Smith et al. |
| 2008/0289421 A1 | 11/2008 | Brignac et al. |
| 2011/0196534 A1 | 8/2011 | Ekes et al. |
| 2012/0197440 A1 | 8/2012 | Farkavec et al. |
| 2015/0316195 A1* | 11/2015 | Penza .................... F16L 55/32 405/184.1 |

FOREIGN PATENT DOCUMENTS

| | | | |
|---|---|---|---|
| JP | 5331905 A | 12/1993 | |
| JP | 5338535 A | 12/1993 | |
| JP | H08233976 A | 9/1996 | |
| KR | 100784932 B1 | 12/2007 | |

OTHER PUBLICATIONS

JLC Robotics, Inc., "Big CISBOT Overview," https://www.youtube.com/watch?v=4HKOhld4DMA, dated Sep. 11, 2012.

JLC Robotics, Inc., "Big CISBOT, Robotic Cast Iron Joint Sealing" Brochure, www.ulcrobotics.com, accessed Mar. 18, 2015.

\* cited by examiner

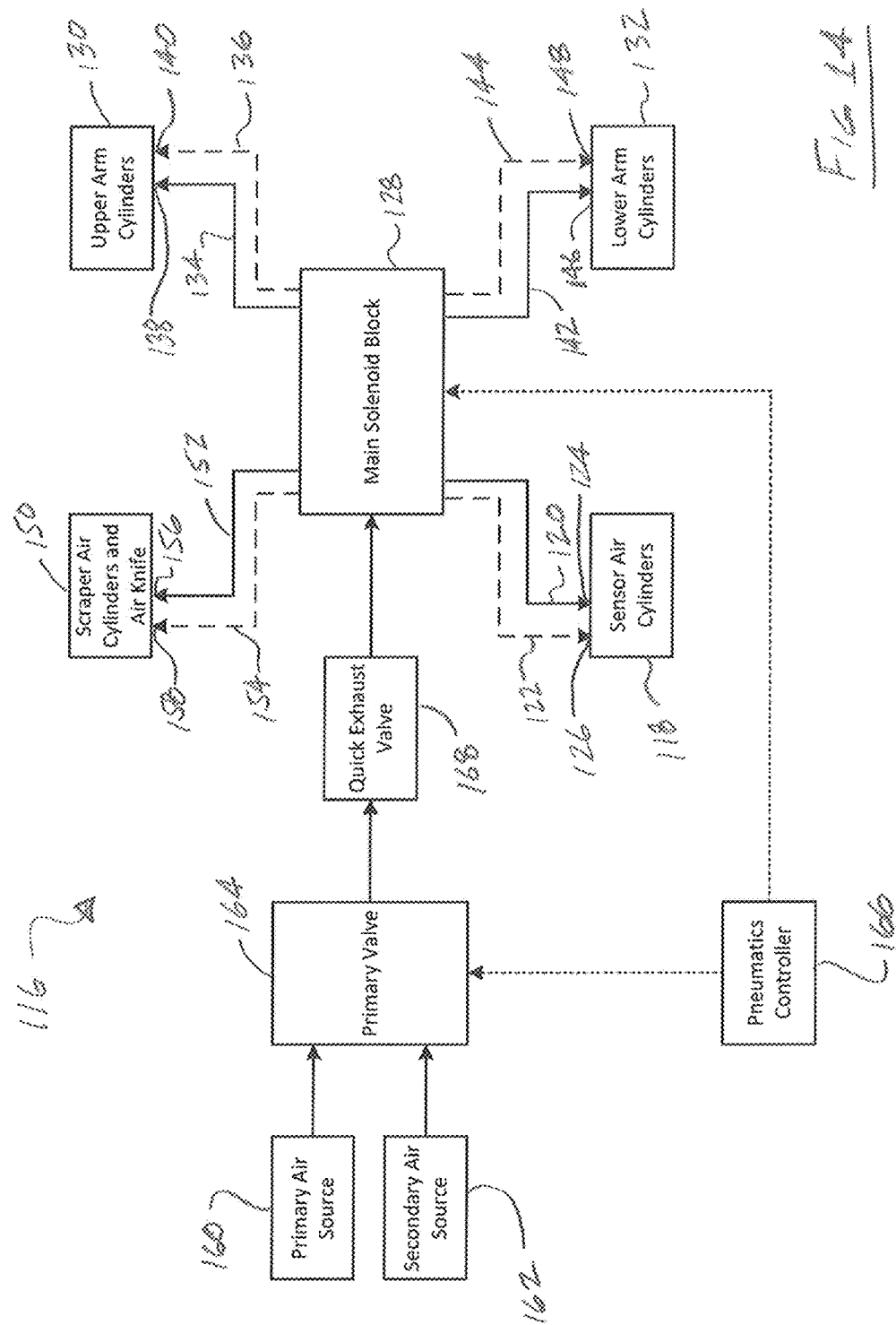

SYSTEM AND METHOD FOR PIPELINE INSPECTION

CROSS-REFERENCE TO RELATED APPLICATIONS

This application claims the benefit of U.S. provisional application Ser. No. 62/409,924 filed Oct. 19, 2016, the disclosure of which is hereby incorporated in its entirety by reference herein.

TECHNICAL FIELD

The present disclosure relates to a system and method for pipeline inspection.

BACKGROUND

A number of systems and methods currently exist for inspecting gas pipelines, some of which may be performed "live"—i.e., where the gas has not been shut off to the area being inspected. Although it may be possible to use a small inspection camera to identify and locate an area in a pipeline that needs repair, determining the type and extent of a defect often requires more information than can be seen with a camera. Certain sensors and other measurement systems may be able to provide the desired information, but the inside of an aging pipeline often presents a harsh environment for sensitive measurement equipment. Repeatedly moving the sensors through the pipeline and taking the desired readings at many different locations may result in sensors becoming contaminated with debris, or damaged, and being rendered unreliable or even inoperable. Therefore a need exists for a system and method that can be utilized to perform internal inspections of a pipeline that overcomes shortcomings of existing system and methods.

SUMMARY

At least some embodiments described herein may include a system for pipeline inspection that includes a sensor arrangement configured to carry one or more sensors for measuring at least one characteristic of the pipeline. A transport module having the sensor arrangement attached thereto may be movable longitudinally through the pipeline and circumferentially around an interior of the pipeline. The sensor arrangement may include a sensor and a sensor cover selectively disposable over the sensor for protecting the sensor from contact with debris or other objects in the pipeline, including the interior surface of the pipeline. The sensor cover includes an exterior surface disposed away from the sensor, and an interior surface disposed toward the sensor, and is movable between a closed position over the sensor and an open position away from and exposing the sensor. The sensor cover may further include a cleaning arrangement disposed proximate the sensor for removing debris from the sensor. The cleaning arrangement may be selectively operable to direct a fluid stream at the sensor.

At least some embodiments described herein may include a method for pipeline inspection. The method may include launching a transport module carrying a sensor arrangement into a pipeline. Drive wheels may be operated to move the transport module linearly along a length of a pipeline, to rotate the transport module circumferentially around an interior of the pipeline, or both simultaneously. A cover on the sensor arrangement may be moved relative to a sensor on the sensor arrangement to expose the sensor to an interior of the pipeline. The sensor may then be moved toward an interior surface of the pipeline. At least one reading may then be taken with the sensor, and the sensor moved away from the interior surface of the pipeline toward the transport module. The cover may then be moved transversely relative to the sensor movement to cover the sensor.

At least some embodiments described herein may include a system for pipeline inspection that includes a transport module operable to traverse an interior of a pipeline. A sensor arrangement carried by the transport module includes a sensor configured to measure at least one characteristic of the pipeline. The sensor arrangement is operable to move the sensor toward and away from an inside surface of a wall of the pipeline, and further includes a cover movable between a closed position covering a surface of the sensor and an open position exposing the surface of the sensor to an ambient environment.

At least some embodiments described herein may include a system for pipeline inspection that includes a transport module operable to traverse an interior of a pipeline. A sensor arrangement is movable by the transport module and includes a sensor and a cleaning arrangement. The cleaning arrangement is connectable to a fluid source and includes a plurality of apertures disposed proximate to a surface of the sensor such that fluid from the fluid source is movable through the apertures and over the surface of the sensor.

At least some embodiments described herein may include a method for pipeline inspection. The method may include positioning a sensor arrangement at a desired location in a pipeline, and retracting a cover of the sensor arrangement to expose a surface of a sensor. The sensor may then be moved toward an inside surface of a wall of the pipeline, and it may be used to obtain information about the pipeline. The cover of the sensor arrangement may then be moved over the surface of the sensor to remove debris.

BRIEF DESCRIPTION OF THE DRAWINGS

FIG. 14 shows a schematic diagram of a deployment system for embodiments of a system described herein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
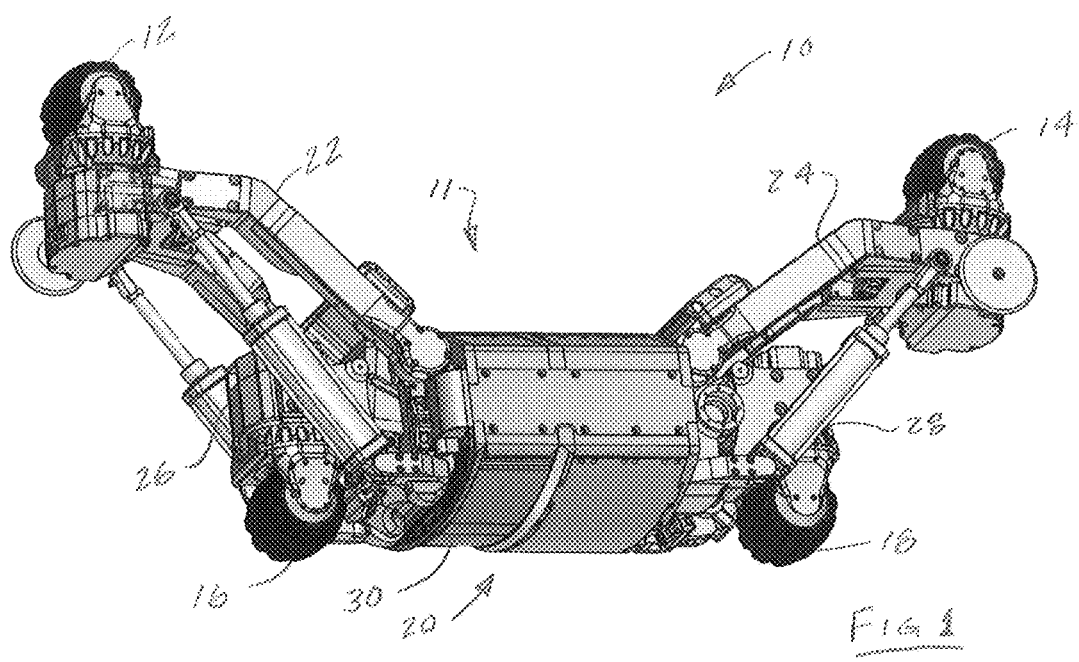
FIG. 1 shows a perspective view of a system for pipeline inspection in accordance with embodiments described herein.

FIG. 1 shows a portion of a system for pipeline inspection 10 in accordance with embodiments described herein. The system 10 includes a transport module 11 having four drive wheels 12, 14, 16, 18, which are operable to move the transport module 11 longitudinally down a pipeline, and when rotated from the position shown in FIG. 1, are also operable to move the transport module 11 circumferentially around an interior of a pipeline. The system 10 is also capable of putting the wheels 12, 14, 16, 18 into positions that are neither completely longitudinal nor completely circumferential. That is, the wheels 12, 14, 16, 18 can be positioned such that the transport module 11 moves circumferentially around the inside of the pipeline wall as it is moving longitudinally down the length of the pipeline. The system 10 includes a sensor arrangement 20 which may be configured to provide data regarding at least one characteristic of a pipeline. For example, a sensor arrangement, such as the sensor arrangement 20, may provide one or more sensors for identifying wall thinning, cracks, corrosion, stress, strain, leaks and other characteristics of the pipeline. Except as otherwise described, a "sensor" as used herein may be a measurement system or device, or more generally, a system or device for determining and outputting information related to parameters or physical properties of a system or its environment.

The wheels 12, 14, 16, 18 of the transport module 11 are respectively carried on arms 22, 24, 26, 28. Although the transport module 11 is effective for transporting the sensor arrangement 20 and moving it into a desired position for taking measurements, other embodiments may employ different transport mechanisms. One such system is described in U.S. patent application publication number 2015/0316195, published on Nov. 5, 2015, which is hereby incorporated herein by reference. The sensor arrangement 20 includes a cover 30, which, among other things, protects one or more sensors. As shown in FIG. 1, the cover 30 is in a closed position, which provides a barrier between one or more sensors and debris or other objects in an interior of a pipeline, including the pipeline wall.

Figure 2:
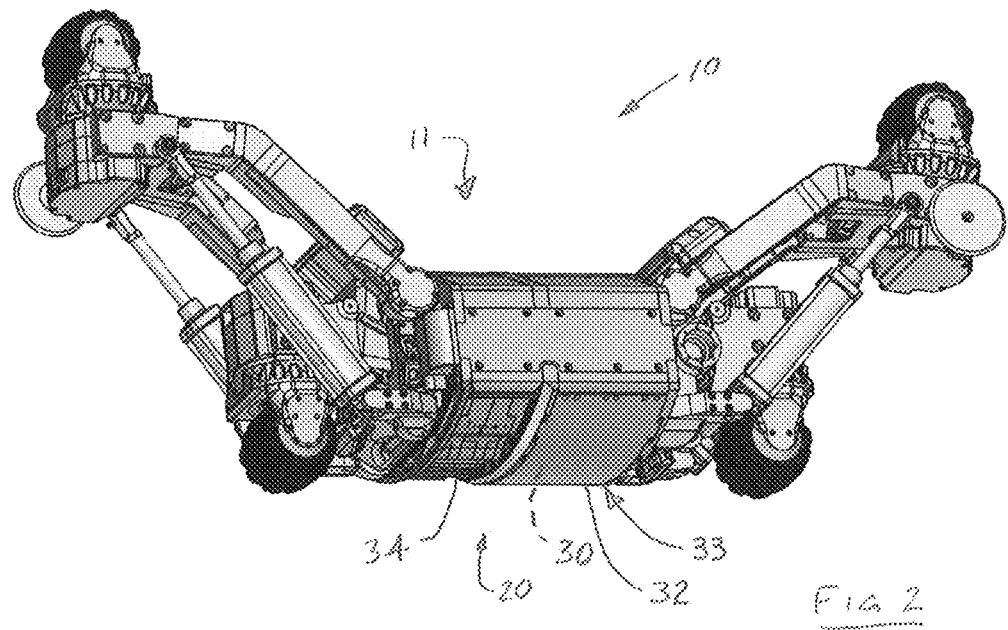
FIG. 2 shows a perspective view of the pipeline inspection system with a sensor cover in an open position revealing a sensor package.
Figure 3:
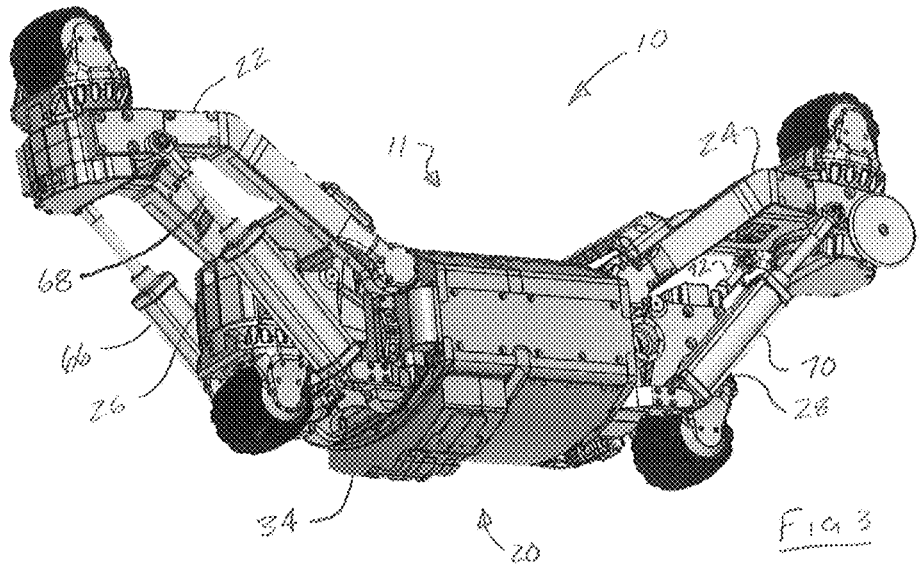
FIG. 3 shows a perspective view of the pipeline inspection system with the sensor package in a partially deployed position.

As shown in FIG. 2, the cover 30 has been retracted such that it is disposed underneath a first portion 32 of a housing 33 of the transport module 11. With the cover 30 in the retracted position, a sensor package 34 is shown. In FIG. 2, the sensor package 34 may include one or more sensors and is disposed within the transport module 11. As explained in more detail below, the sensor package 34 is movable outward such that it can come into close proximity with—and even make contact with—an inside surface of a wall of the pipeline. In FIG. 3, the sensor package 34 is shown after it has been extended outward away from the transport module 11, for example, toward a wall of a pipeline. The sensor package 34 is further movable outward through a pivot-drive mechanism explained in more detail below in conjunction with FIGS. 7 and 9.

A sensor package, such as the sensor package 34, may include sensors that are visual, auditory, eddy current, ultrasonic, magnetic, or any other of a number of desirable types of sensors or sensor arrangements at least some of which may be useful for identifying and locating problem areas within a pipeline. The transport module 11, or other portions of the system 10, may also carry one or more video cameras, lights or other devices which may also be useful for identification and repair of a pipeline. Images from all of the cameras may be conveyed back to an operator station and recorded throughout the inspection process. An integrated video may then be assembled to create an accurate model of the pipeline based on visible data—i.e., photogrammetry may be applied to the video streams captured during the inspection process. In addition to the transport module 11, a system, such as the system 10, may include other elements, at least some of which may be remotely located from the pipeline. For example, video monitors or other output devices may be used to interpret and display signals output from the sensor package 34. Power and communications cables may be used to transfer data and power to and from the transport module 11, although wireless signals may also be used.

Figure 4:
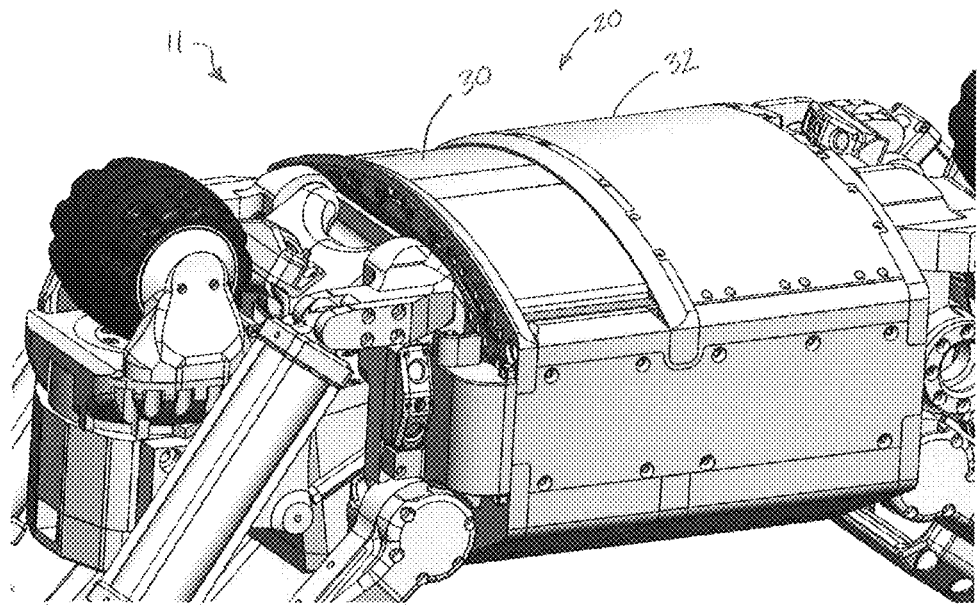
FIG. 4 shows a close-up view of the sensor cover in a closed position.
Figure 5:
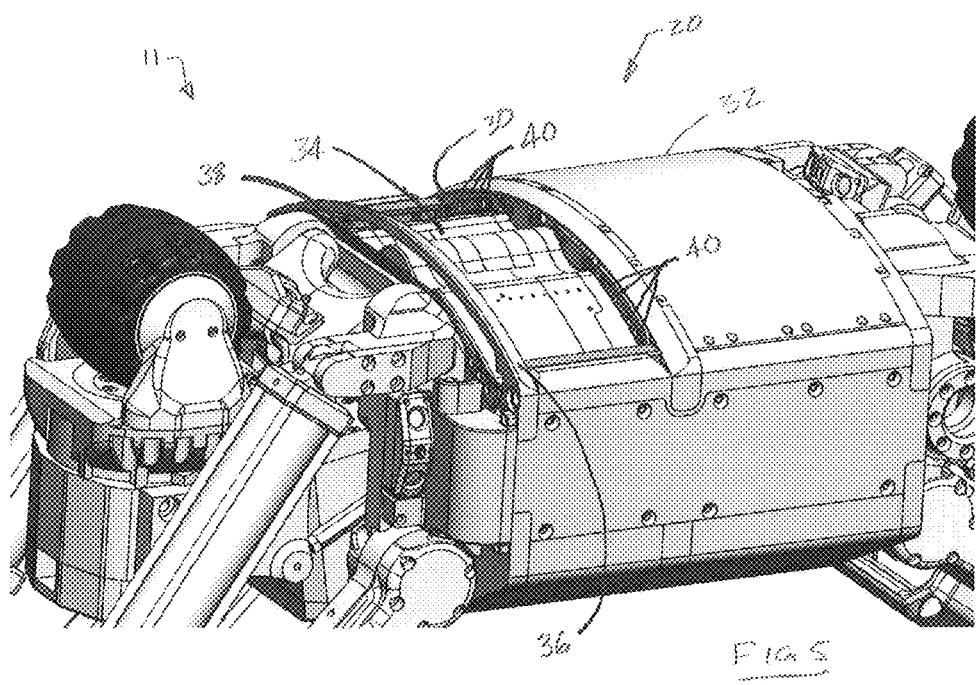
FIG. 5 shows a close-up view of the sensor cover in the open position.

FIGS. 4-7 show close-up views of the sensor arrangement 20 in a fully retracted and covered position, and as it is exposed and deployed, for example, toward a wall inside the pipeline. In FIG. 4, the cover 30 is closed, which helps to protect the sensor package 34 from debris and other hazards within a pipeline. In FIG. 5, the cover 30 is open, which exposes the sensor package 34 to the ambient environment, which may be the interior of a pipeline. The cover 30 is specifically configured—e.g., sized and shaped—to fit very closely with the sensor package 34. In this way, the cover 30 may act to move debris off of the surface of the sensor package 34—e.g., by scraping—as it moves from the open position as shown in FIG. 5 to the closed position as shown in FIG. 4. To ensure that debris does not get caught between an edge of the cover 30 and the housing 33 of the transport module 11, a second portion 36 of the housing 33 disposed across from the first housing portion 32 includes an open portion 38 through which any debris may be directed.

In addition to the scraping feature described above, the cover 30 in this embodiment includes a cleaning arrangement 39 having a number of apertures 40 through which a fluid stream, such as air or other gases, may be directed over the surface of the sensor package 34 to further clean the sensors. Although the cleaning arrangement 39 is part of the cover 30 in this embodiment, in other embodiments a cleaning arrangement may be part of a different portion of the sensor arrangement, or may even be part of a transport module.

Figure 6:
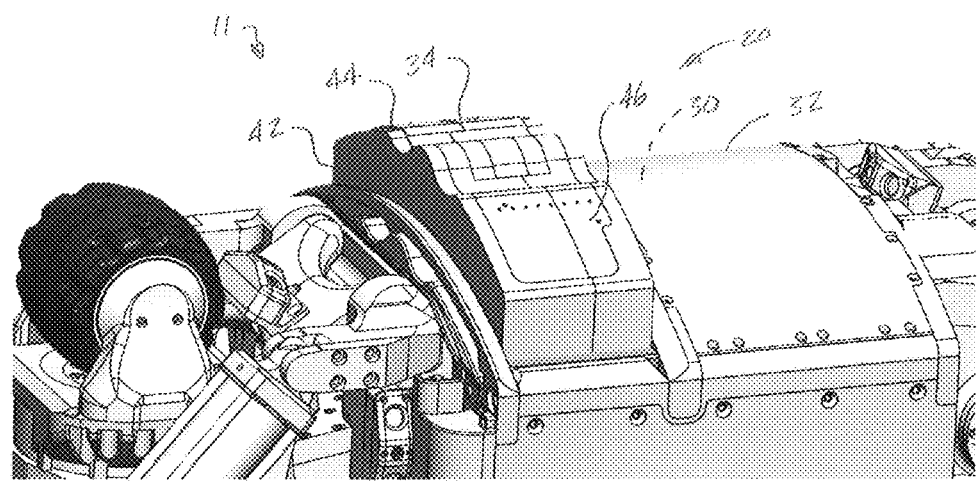
FIG. 6 shows a close-up view of the sensor package in a partially deployed position.
Figure 7:
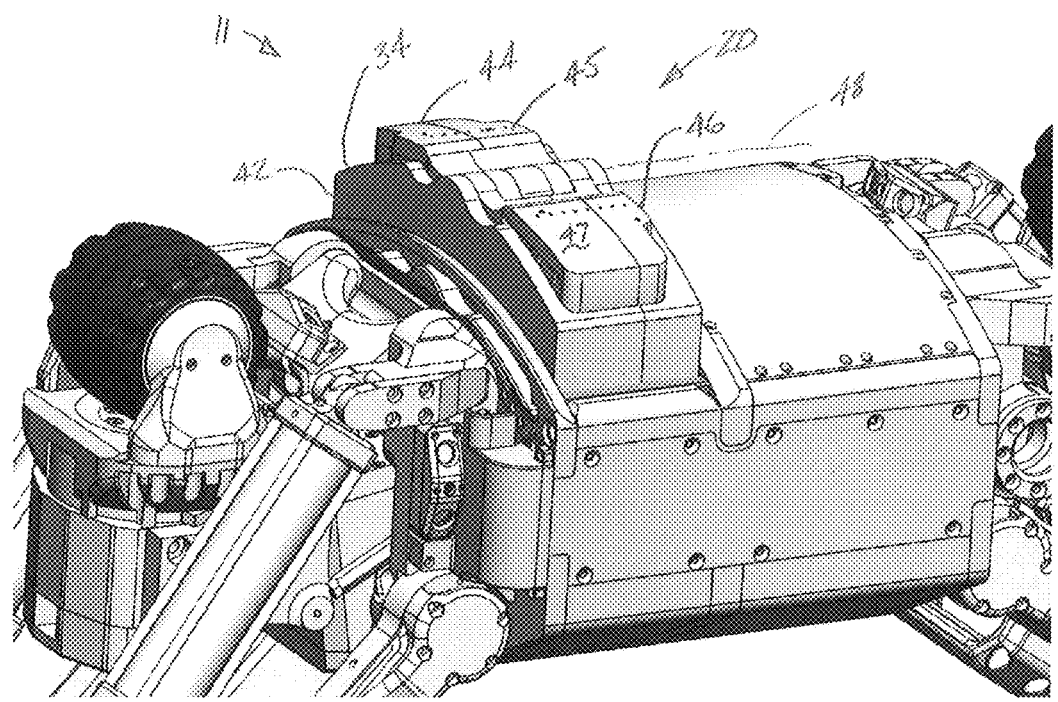
FIG. 7 shows a close-up view of the sensor package in a fully deployed position.
Figure 8:
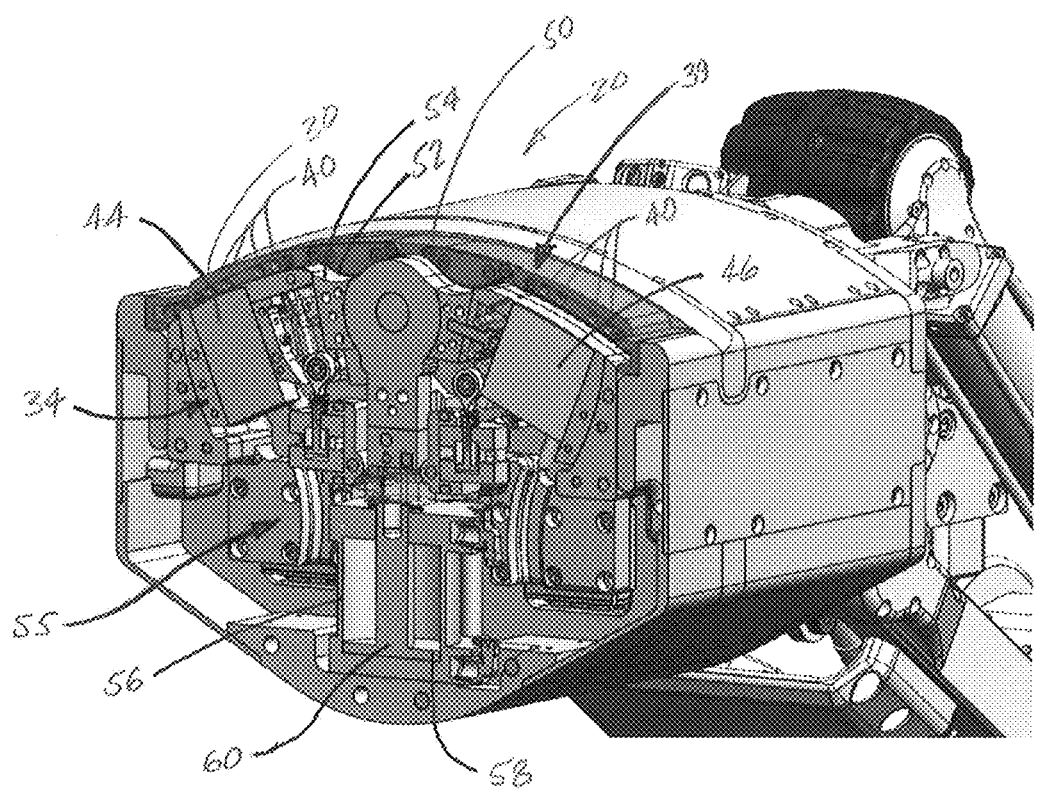
FIG. 8 shows a partial cut-away view of a sensor arrangement with the sensor package in a retracted position.

FIG. 6 shows the sensor package 34 in a partially deployed position. In this position, a main body 42 of the sensor package 34 has been moved outward away from the transport module 11; however, two sensors 44, 46 are still retracted and not yet fully deployed. In FIG. 7, however, the sensors 44, 46 have been moved away from the main body 42 of the sensor package 34 and are shown in their fully deployed position. More specifically, the sensors 44, 46 have been pivoted outward around a common pivot axis 48. FIG. 8 shows a partial cut-away view of the sensor arrangement 20. The sensors 44, 46 have respective surfaces 45, 47, which form part of a surface 54 of the sensor package 34. As shown in FIG. 8, the cover 30 has an exterior surface 50 disposed away from the sensor package 34 and an interior surface 52 disposed toward the sensor package 34. The surface 52 has a contour configured relative to a contour of the surface 54 of the of the sensor package 34, and more particularly, relative to contours of the surfaces 45, 47 of the sensors 44, 46, such that the cover 32 is operable to move debris off of the surface 54 and the surfaces 45, 47 when the cover 30 is closed. In the embodiment shown in FIG. 8, the contour of the interior surface 52 of the cover 30 substantially matches the contour of the surface 54. The apertures 40 are included as part of the cleaning arrangement 39 for the sensor package 34, and as described above may direct a fluid stream over the surface 52 of the sensors 44, 46.

Embodiments may include a deployment system 55 for the sensors 44, 46, and in some embodiments a deployment system may include a multi-stage deployment system where different stages may move the sensors 44, 46 with different amounts of force or with different types of movements—e.g., linear or rotating. To move the sensor package 34 from its fully retracted position as shown in FIG. 5 to its partially deployed position as shown in FIG. 6 the deployment system 55 of the present embodiment uses a pneumatic actuator, which in this embodiment is a pneumatic cylinder arrangement 56. A relatively broad base 58 of a piston 60 helps to ensure ample force is applied to the sensor package 34 as the piston 60 is moved upward—as oriented in FIG. 8—to deploy the sensor package 34 in the first deployment stage. In at least some embodiments, the sensors 44, 46 may be contact sensors, and to ensure a satisfactory sensor reading may need to be applied to an inside surface of a wall of a pipeline with significant force. The cylinder arrangement 56 helps to ensure that adequate force is available. As explained in more detail below in conjunction with FIG. 14, the deployment system 55—which is specific to the sensors 44, 46—may be a part of a much larger deployment system relying on a number of pneumatic valves, cylinders, etc.

Figure 9:
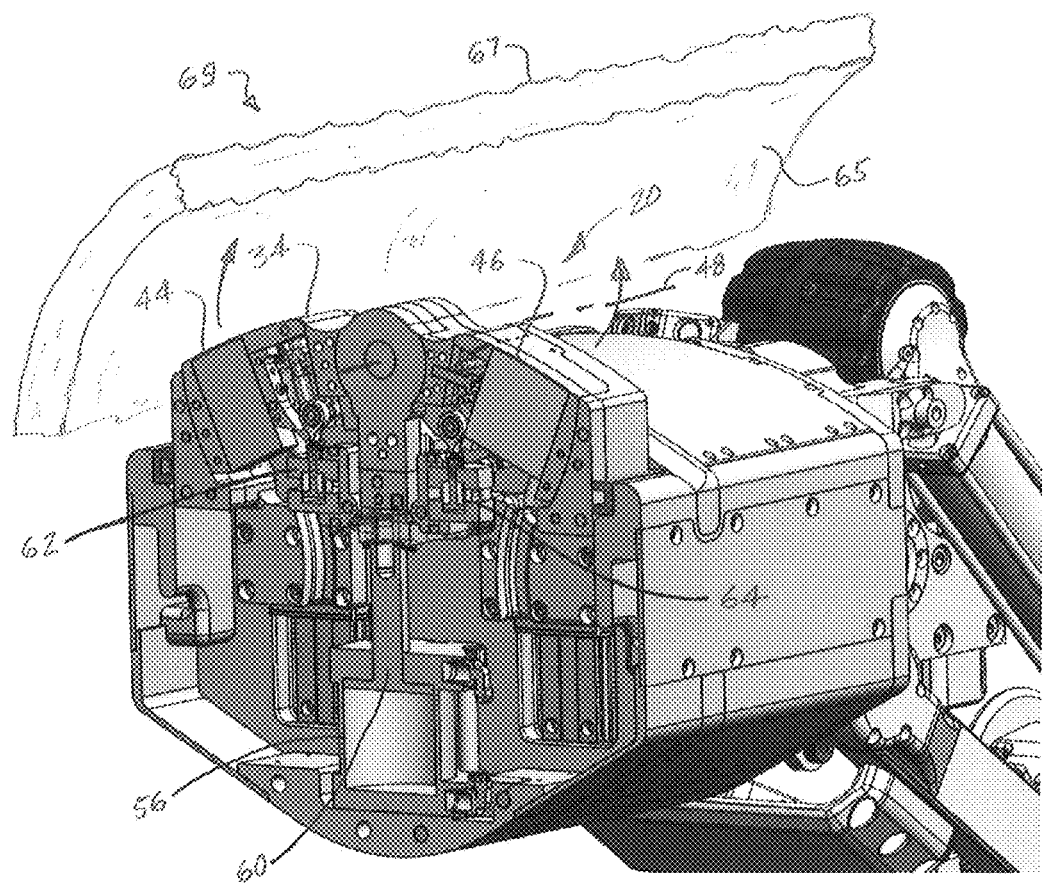
FIG. 9 shows a partial cut-away view of the sensor arrangement with the sensor package in a partially deployed position.

FIG. 9 shows the sensor package 34 in its partially deployed position. It is only partially deployed because the sensors 44, 46 have not yet pivoted outward around the axis 48. In the embodiment shown in FIG. 9, the deployment system 55 includes pneumatic actuators, which in this embodiment are pneumatic cylinder arrangements 62, 64, which are used to rotate the sensors 44, 46 outward toward an inside surface 65 of a wall 67 of a pipeline 69. As the pneumatic cylinder arrangements 62, 64 are operated, the sensors 44, 46 respectively move outward; however, because the sensors 44, 46 are hinged at the axis 48, they tend to pivot outward as shown by the arced direction arrows—see also FIG. 7 showing the sensors 44, 46 pivoted outward. In the embodiment shown in FIG. 8, the pneumatic cylinder arrangements 62, 64 are not as large as the pneumatic cylinder arrangement 56. As a result, the pneumatic cylinder arrangements 62, 64 may not move the sensors 44, 46 with as much force as the pneumatic cylinder arrangement 56, but they may provide greater control for proper placement of the sensors 44, 46 relative to the pipeline wall 67.

In at least some embodiments, a positive-pressure fluid source connected to an inlet of the pneumatic actuator 56 can be used to move the piston 60—and hence the sensor package 34—outward, and if a positive-pressure fluid source is connected to an outlet of the pneumatic actuator 56, the piston 60 and the sensor package 34 may be moved inward. This can assist with retrieval of the system 10 in case the transport module 11 is not capable of self-propulsion. The same arrangement is applicable with a positive-pressure fluid source and the fluid inlet and outlet of the pneumatic actuators 62, 64. In some embodiments, the fluid may be air, although in some situations—for example when working with a combustible gas—it may be desirable to use a fluid that does not contain oxygen. Therefore, in some embodiments, nitrogen or other fluids that do not contain oxygen may be used.

In order to ensure proper orientation and contact between sensors, such as the sensors 44, 46, and an inside surface of a wall of a pipeline, embodiments may also include one or more positional and placement sensors. For example, one or more sensors may be included on a transport module, such as the transport module 11, that provide information used to ascertain the placement of sensors and the position of the transport module within the pipeline. Proximity or other positioning sensors in or near the sensor arrangement 20 can be used to determine and output information related to whether the sensors 44, 46 are placed properly on or near the inside surface of a wall of the pipeline. If the transport module 11 is not aligned longitudinally in the pipeline, or if the sensors 44, 46 are otherwise angled relative to the pipeline wall, good contact or other positioning may not be achieved. Feedback from the proximity sensors can be used to adjust the position of the transport module 11 and the sensors 44, 46 to achieve a desired position, including good contact with the pipeline wall. Positional sensors may be used to provide information regarding the specific location of the arms 22, 24 so that proper radial positioning of the sensor arrangement 20 relative to the pipeline wall can be achieved. In addition, the sensors can be utilized by control software of the system 10 to automate measurements by the sensors 44, 46.

As best seen in FIG. 3, each of the arms 22, 24 is pivoted by two pneumatic cylinders. Pneumatic cylinders 66, 68 are used to pivot the arms 22, and pneumatic cylinders 70, 72 are used to pivot the arms 24. The arms 26, 28 are also actuated by pneumatic cylinders. In case the transport module 11 is inside a pipeline and there is a power failure, it may be difficult to retrieve the transport module 11 if the arms 22, 24, 26, 28 are extended against the inside pipeline wall with a large amount of force. In addition, if the sensors 44, 46 are disposed against the pipeline wall, they may be damaged if an attempt is made to retrieve the transport module 11 manually.

Therefore, embodiments may include a shut-down protocol wherein all of the pneumatic pressure is released. This eliminates the force that the arms 22, 24, 26, 28 and the sensor package 34 apply to the pipeline wall. Unfortunately, the sensor package 34 may still be damaged and the arms 22, 24 may impinge on obstacles if the transport module 11 is manually retrieved, for example, by pulling a power and communications cable 74—see FIGS. 10 and 11—from outside the pipeline. As part of a manual retrieval protocol, embodiments of systems, such as the system 10, may re-introduce fluid to the pneumatic systems through one or more exhaust ports of one or more of the solenoids and various pneumatic actuators in the system.

In at least one embodiment, a single solenoid feeds a manifold to which other solenoids are connected. When power is lost, the single solenoid has no electrical signal and the fluid flow through it is prohibited. All fluid is lost from the pneumatic system such that the arms and sensor package are "limp"; in this state it would be undesirable to attempt to manually retrieve the transport module 11. To put the system in a better state for retrieval, fluid is introduced into the exhaust port of the single solenoid, which allows fluid to pass through it and into the manifold. Through the manifold, the fluid pressurizes the system to a predetermined level, which puts the arms and sensor package in their respective retrieval positions.

Figure 10:
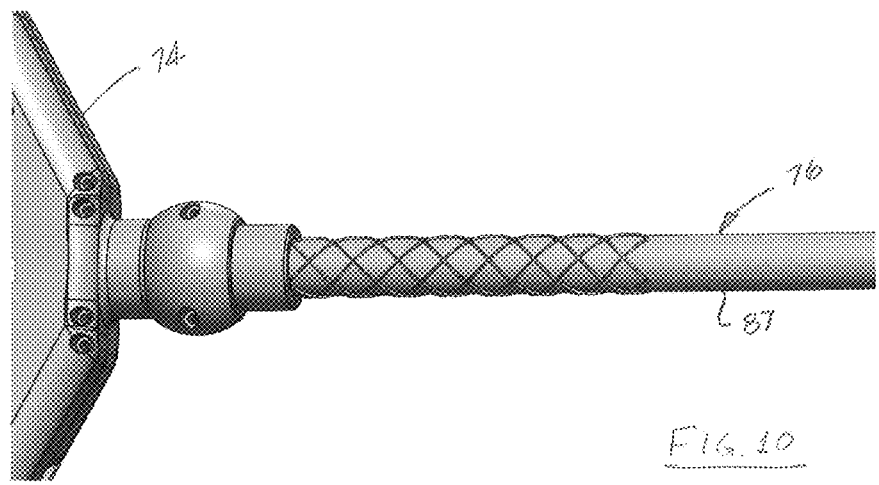
FIG. 10 shows a portion of a cable guide and a power and communications cable that may be used with the system shown in FIG. 1.
Figure 11:
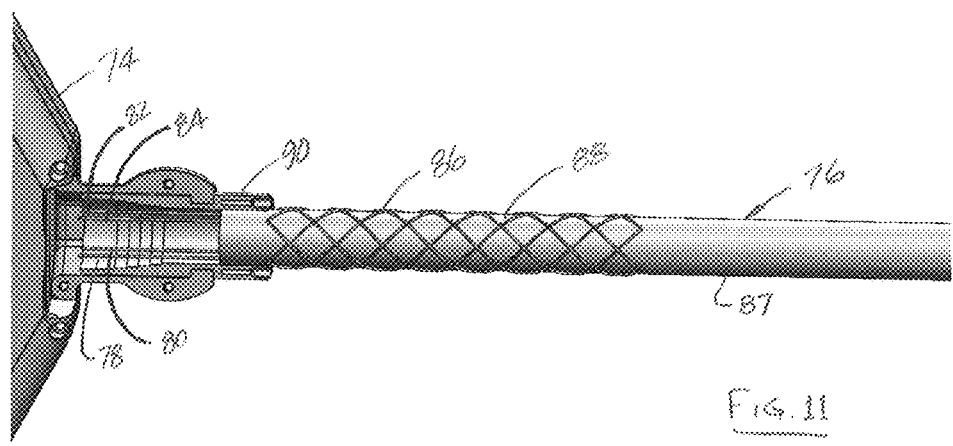
FIG. 11 shows a partial cut-away view of the cable guide and power and communications cable shown in FIG. 10.

FIG. 10 shows a portion of a cable guide 74 that may be used with systems, such as the system 10 illustrated and described above. The cable guide 74 attaches to a transport module, such as the transport module 11. It may be attached, for example, with screws, bolts, rivets, or other fasteners, which in some cases may provide easy connection to and disconnection from the transport module. It provides attachment for a power and communications cable 76 that may connect the transport module 11 with a control system located outside of the pipeline. FIG. 11 shows a partial cut-away view of the cable guide 74 and the cable 76, wherein the power and communications wires and cables have been removed for clarity. Running from the cable 76 and attaching to the cable guide 74 are a number of reinforcement members 78, 80, 82, 84, which provide strain relief for the power and communications wires and cables. The reinforcement members 78, 80, 82, 84 may in some embodiments be fibers made from Kevlar or some other material, and glued or otherwise firmly affixed to an inside of the cable guide 74.

In order to provide additional tensile strength to the attachment of the cable 76 to the cable guide 74, a cable support, which in this embodiment is a wire mesh 86, is disposed on an outside 87 of the cable 76, and in particular, over one end 88 of the cable 76. The cable support 86 is affixed to the cable guide 74 at a clamp 90. The cable support 86 may be bolted directly to the clamp 90 to ensure a strong connection. In the event of a power failure where the transport module 11 is deep within a pipeline, the protocol for reintroducing fluid into the exhaust ports of the pneumatic system may be employed, and then the cable 76 pulled from outside the pipeline to manually retrieve the transport module 11. During the manual retrieval process, the reinforcement members 78, 80, 82, 84 may be broken from their attachment to the inside of the cable guide 74. The cable itself 76 is firmly affixed to the cable guide 74 in the clamp 90, but if it starts to move out of the clamp 90, the cable support 86 is stretched and squeezes on the end 88 of the cable 76 to help ensure that the connection between the cable 76 and the cable guide 74 is maintained. More specifically, the cable support 86 is configured to exert force radially inward on the outside 87 of the cable 76 when an axial tensile force is applied to the cable 76 and moves the cable 76 axially.

Figure 12:
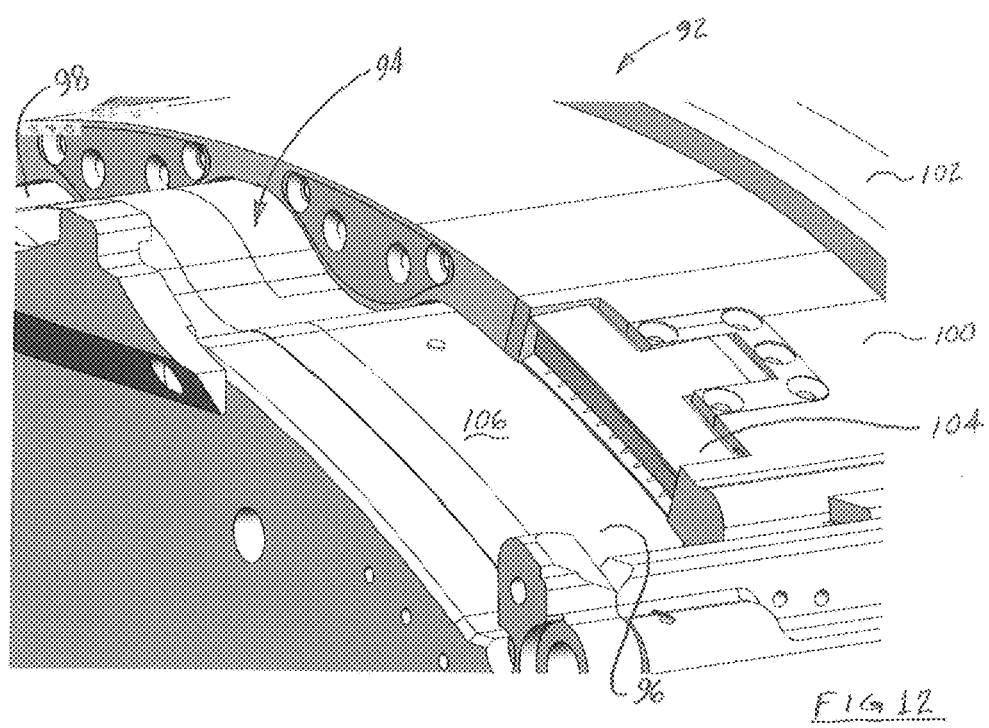
FIG. 12 shows a partial cut-away view of a sensor arrangement having a cleaning arrangement disposed proximate thereto.

FIG. 12 shows a portion of a transport module 92, which may be configured similarly to the transport module 11 described above. The transport module 92 carries a sensor arrangement 94, which also may be, for example, configured similarly to the sensor arrangement 20 described above. Shown in its retracted position, the sensor arrangement 94 includes a sensor 96 on one side, and a number sensor 98 disposed on an opposite side. The sensor arrangement 94 includes a retractable cover 100, which can be positioned over the sensors 96, 98, or retracted to a position under a housing 102 of the transport module 92.

Figure 13:
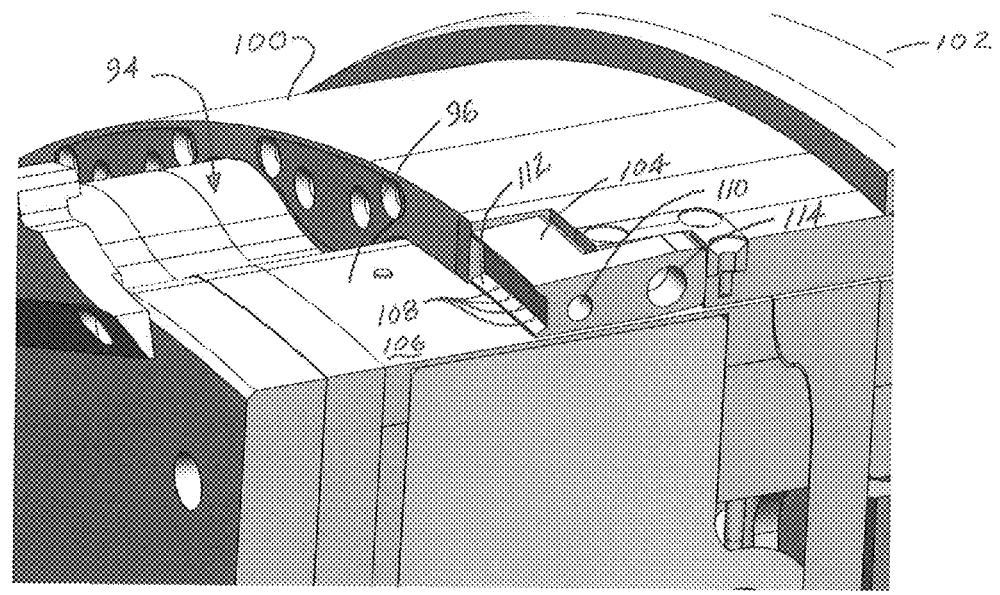
FIG. 13 shows a cross-sectional view of the sensor arrangement and cleaning arrangement shown in FIG. 12.

The cover 100 includes a cleaning arrangement 104 that is positioned directly above a surface 106 of the sensor 96. A similar cleaning arrangement may be positioned over a surface of the other sensor 98 on the opposite side of the sensor arrangement 94. FIG. 13 shows a cross-sectional view of a portion of the cleaning arrangement 104 and the sensor arrangement 94. The cleaning arrangement 104 includes several openings 108 through which a fluid can be directed across the surface 106 of the sensor 96. A fluid may be introduced into the cleaning arrangement 104 through an intake port 110. In addition to providing a fluid stream to clean the sensor 96, the cleaning arrangement 104 includes a tapered edge 112 to facilitate a scraping action as the cover 100 is moved from an open position to a closed position. The cleaning arrangement 104 may also be attached to the cover 100 at a pivoting attachment point 114. A slight pivoting movement of the cleaning arrangement 104 may assist in dislodging debris from the surface 106 as the cover 100 moves to a closed position.

FIG. 14 shows a schematic diagram 116 of a deployment system that may be used in accordance with systems and methods described above. Referring to elements already described and illustrated, sensor air cylinders 118 may include, for example, pneumatic cylinder arrangements 56, 62, 64—see FIGS. 8 and 9. In the schematic diagram 116, the term "air" is used for convenience, although a fluid other than air, such as nitrogen, may be used instead. Entering block 118 are two inputs: 120 indicated by a solid line, and 122 indicated by a dashed line. As explained in more detail below, these are fluid supply lines that allow the cylinders 118 to be actuated.

In at least some embodiments, each of the cylinders making up the group of cylinders in block 118 may be double acting cylinders where each of two different ports may act as an inlet. For example, the fluid line 120 enters the cylinders 118 at a port 124, and the fluid line 122 enters the cylinders at a port 126. In the case where the schematically-represented cylinders 118 include three separate cylinders—for example, pneumatic cylinder arrangements 56, 62, 64—there would be two ports for each of the cylinder arrangements; however, for illustrative purposes, only the two ports 124, 126 are shown in this schematic. Each of the ports 124, 126 can act as an inlet to actuate the cylinders 118. In this embodiment, fluid coming in through the port 124 will act to extend the cylinders 118, while fluid coming in from the port 126 will act to retract the cylinders 118. As explained in more detail below, a main solenoid block 128 is used to control which of the two ports 124, 126 receives fluid.

Also shown in FIG. 14 are schematic representations of upper arm cylinders 130 and lower arm cylinders 132, which are used control the arms 22, 24, 26, 28 of the transport module 11—see FIG. 1. The upper arm cylinders 130 are also fed by two fluid lines 134, 136 having respective ports 138, 140 acting as inlets into the cylinders 130. Similarly, the lower arm cylinders 132 are fed by two fluid lines 142, 144 having respective ports 146, 148. Block 150 in the diagram 116 represents cylinders used to actuate a cover, such as the cover 30 illustrated in FIG. 1, and fluid used for a cleaning arrangement, such as the cleaning arrangement 39 illustrated in FIG. 8 and the cleaning arrangement 104 illustrated in FIG. 12. In block 150, the cylinders used to actuate the cover are referred to as "Scraper Air Cylinders" and the cleaning arrangement is referred to as an "Air Knife", each of which describes at least some of the functionality of these elements. The scraper air cylinders and the air knife in block 150 are shown as being fed by two fluid lines 152, 154, each having respective ports 156, 158, although in practice the scraper air cylinders and the air knife would each have separate fluid lines. Because the air knife is not a cylinder, but rather, is a series of air jets used to clean the sensor, it may have a single fluid line as an input.

In the embodiment shown in FIG. 14, the deployment system uses both a primary fluid source 160 and a secondary fluid source 162, which may be conveniently used when power to the system is lost and manual retrieval from a pipeline is required. When a system, such as the system 10, is receiving electrical power, a primary valve 164 may be controlled by a pneumatic controller 166. As explained in more detail below, the pneumatic controller 166 may also be used control the main solenoid block 128. Positioned between the primary valve 164 and the main solenoid block 128 is a quick exhaust valve 168, which may also be advantageously used when power to the system is lost.

When the system is receiving electrical power, the controller 166 will operate the primary valve 164 so that it is open to receiving fluid from the primary source 160, and prohibited from receiving air from the secondary source 162. Fluid from the primary source 160 flows through the primary valve 164 and through the quick exhaust valve 168 into the main solenoid block 128. The controller 166 then controls the main solenoid block 128 to provide fluid to one or more of the subsystems indicated by the cylinders 118, 130, 132, 150. The main solenoid block 128 may be controlled to allow fluid to flow through either of the two ports associated with each of these subsystems such that cylinders may be extended or retracted as desired. As described above, when a system, such as the system 10, loses electrical power, a retrieval protocol may be implemented.

In the embodiment illustrated in FIG. 14, a retrieval protocol may include some or all of the following steps. First, as electrical power to the controller 166 is lost, the primary valve 164 will default to a normally closed position with regard to the primary fluid source 160. This may result in a higher pressure at the subsystems 118, 130, 132, 150 as compared to the pressure at the primary valve 164. This pressure differential may cause fluid to move back through the main solenoid block 128 and into the quick exhaust valve 168, where the excess pressure is exhausted. When electrical power to the controller 166 is lost, the primary valve 164 is also without power. As noted above, it defaults to a normally closed position with regard to the primary fluid source 160, but it defaults to a normally open position with regard to the secondary source 162. This allows the fluid to pass through the primary valve 164, through the quick exhaust valve 168, and into the main solenoid block 128.

Similar to the primary valve 164, the main solenoid block 128 also has its default protocol, which is to allow fluid to flow through each of the fluid lines that allow some or all of the cylinders to retract. In one embodiment, the rear upper-arm cylinders and both lower-arm cylinders may be retracted as part of the retrieval protocol. Similarly, the sensor cylinders may also be retracted to help ensure that the sensor arrangement is not damaged upon retrieval. The retrieval protocol may cause the main solenoid block 128 to allow fluid flow to both of the lower arm cylinders 132, all of the sensor air cylinders 118, and at least the rear upper arm cylinders forming a part of the subsystem 130, so that each of these cylinders is retracted for retrieval. With this configuration, if the system loses power, back pressure is exhausted through the quick exhaust valve 168 such that the various cylinders become "limp". After that, fluid from the secondary fluid source 162 is controlled to flow through the appropriate ports to retract the various cylinders so the system can be retrieved without damage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for pipeline inspection, comprising:
a transport module operable to traverse an interior of a pipeline; and
a sensor arrangement carried by the transport module and including a sensor configured to measure at least one characteristic of the pipeline, the sensor arrangement being operable to move the sensor toward and away from an inside surface of a wall of the pipeline, the sensor arrangement further including a cover movable between a closed position covering a surface of the sensor and an open position exposing the surface of the sensor to an ambient environment.

2. The system of claim 1, wherein the cover includes an interior surface facing the surface of the sensor, the interior surface of the cover having a contour configured relative to a contour of the surface of the sensor to facilitate removal of debris from the surface of the sensor by the cover when the cover is moved from the open position to the closed position.

3. The system of claim 2, wherein the transport module includes a housing having an open portion positioned such that debris removed from the surface of the sensor is directed through the open portion by the cover when the cover is moved from the open position to the closed position.

4. The system of claim 1, wherein the sensor arrangement further includes a cleaning arrangement connectable to a fluid source and including a plurality of apertures positioned such that fluid from the fluid source is directable through the apertures and over the surface of the sensor.

5. The system of claim 4, wherein the cleaning arrangement is pivotably attached to the cover.

6. The system of claim 1, wherein the sensor arrangement includes a deployment system for the sensor having a first deployment stage configured to move the sensor outward with a first force and a second deployment stage configured to move the sensor further outward with a second force less than the first force.

7. The system of claim 6, wherein the first deployment stage is configured to move the sensor linearly, and the second deployment stage is configured to rotate the sensor.

8. The system of claim 1, further comprising:
a cable attached to the transport module; and
a cable support positioned on an outside of the cable, the cable support being configured to exert a force radially inward on the outside of the cable when an axial tensile force is applied to the cable and moves the cable axially.

9. The system of claim 1, further comprising:
a primary fluid source;
a secondary fluid source; and
a primary valve fluidly connected to the primary fluid source and the secondary fluid source and configured to selectively allow and prohibit fluid from the primary fluid source to flow through the primary valve when the primary valve receives electrical power, and further configured to allow fluid from the secondary fluid source and prohibit fluid from the primary fluid source to flow through the primary valve when the primary valve does not receive electrical power.

10. The system of claim 1, wherein the sensor arrangement includes a deployment system for the sensor, the deployment system including a pneumatic actuator having an inlet and an outlet, the deployment system being configured to move the sensor outward when a fluid source is connected to the inlet, and to move the sensor inward when a fluid source is connected to the outlet.

11. A system for pipeline inspection, comprising:
a transport module operable to traverse an interior of a pipeline; and
a sensor arrangement movable by the transport module and including a sensor and a cleaning arrangement connectable to a fluid source and including a plurality of apertures disposed proximate to a surface of the sensor such that fluid from the fluid source is movable through the apertures and over the surface of the sensor.

12. The system of claim 11, wherein the sensor arrangement further includes a retractable cover operable to selectively cover the surface of the sensor.

13. The system of claim 12, wherein the cover includes an interior surface facing the surface of the sensor, the interior surface of the cover having a contour configured to facilitate removal of debris from the surface of the sensor by the cover when the cover is operated to cover the surface of the sensor.

14. The system of claim 11, wherein the transport module is configured to move the sensor arrangement outward toward an inside surface of a wall of a pipeline, and the sensor arrangement is configured to move the sensor further outward toward an inside surface of a wall of a pipeline using a multi-stage deployment system.

15. The system of claim 14, wherein the multi-stage deployment system includes a first deployment stage configured to move the sensor outward with a first force and a second deployment stage configured to move the sensor further outward with a second force less than the first force.

16. A method for pipeline inspection, comprising:
positioning a sensor arrangement at a desired location in a pipeline
retracting a cover of the sensor arrangement to expose a surface of a sensor;
moving the sensor toward an inside surface of a wall of the pipeline;
using the sensor to obtain information about the pipeline; and
moving the cover of the sensor arrangement over the surface of the sensor to remove debris from the surface of the sensor.

17. The method of claim 16, further comprising using a portion of the sensor arrangement to direct a fluid stream over the surface of the sensor to remove debris from the surface of the sensor.

18. The method of claim 16, wherein moving the sensor toward an inside surface of a wall of the pipeline includes using a pneumatic actuator to move the sensor outward in a first deployment stage, and using a different pneumatic actuator to move the sensor further outward in a second deployment stage.

19. The method of claim 18, wherein the sensor is moved outward in the first deployment stage with a first force, and the sensor is moved further outward in the second deployment stage with a second force less than the first force.

20. The method of claim 16, wherein moving the sensor toward an inside surface of a wall of the pipeline includes supplying fluid from a first fluid source through a valve to a pneumatic actuator to move the sensor outward when the valve receives electrical power, the method further comprising moving the sensor inward by supplying fluid from a second fluid source to an outlet of the pneumatic actuator when the valve does not receive electrical power.

* * * * *